(12) United States Patent
Kunnathur Ragupathi et al.

(10) Patent No.: US 10,078,610 B2
(45) Date of Patent: Sep. 18, 2018

(54) SYSTEM AND METHOD FOR OPTIMIZED THERMAL CONTROL FOR MANAGEMENT CONTROLLER OFFLINE

(71) Applicant: DELL PRODUCTS, L.P., Round Rock, TX (US)

(72) Inventors: Dinesh Kunnathur Ragupathi, Round Rock, TX (US); Hasnain Shabbir, Round Rock, TX (US); Arun Muthaiyan, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 594 days.

(21) Appl. No.: 14/702,922

(22) Filed: May 4, 2015

(65) Prior Publication Data
US 2016/0328349 A1 Nov. 10, 2016

(51) Int. Cl.
G06F 1/26 (2006.01)
G06F 13/40 (2006.01)
G06F 13/42 (2006.01)

(52) U.S. Cl.
CPC .......... *G06F 13/4068* (2013.01); *G06F 1/266* (2013.01); *G06F 13/42* (2013.01); *Y02B 60/1228* (2013.01); *Y02B 60/1235* (2013.01); *Y02D 10/14* (2018.01); *Y02D 10/151* (2018.01)

(58) Field of Classification Search
CPC ...... G06F 1/266; G06F 13/4068; G06F 13/42; Y02B 60/1228; Y02B 60/1235
See application file for complete search history.

(56) References Cited

U.S. PATENT DOCUMENTS

| | | |
|---|---|---|
| 6,058,718 A | 5/2000 | Forsberg et al. |
| 7,196,903 B2 | 3/2007 | Vuong et al. |
| 7,475,665 B2 | 1/2009 | Ketelhohn et al. |
| 7,612,508 B2 | 11/2009 | Jreij et al. |
| 7,621,460 B2 | 11/2009 | Dorr |
| 7,721,125 B2 | 5/2010 | Fung |
| 7,742,844 B2 | 6/2010 | Coxe, III |
| 8,051,675 B1 | 11/2011 | Carlson et al. |
| 8,269,360 B2 | 9/2012 | Boisvert et al. |
| 8,350,711 B2 | 1/2013 | Berke et al. |
| 8,602,092 B2 | 12/2013 | Lenehan et al. |
| 8,832,348 B2 | 9/2014 | Cepulis et al. |

(Continued)

*Primary Examiner* — Jennifer L Norton
(74) *Attorney, Agent, or Firm* — Isidore PLLC

(57) ABSTRACT

An information handling system (IHS) includes functional components that are housed within a chassis and interconnected in a configuration of one or more servers to operate as a fully functional IHS. An infrastructure system includes a power throttle module to limit power usage by the functional components and/or a fan module to cool the functional components. An access controller is provided in communication with a sensor which dynamically receives data related to a thermal load that is created by the functional components. A management controller responds to the data being available by controlling the infrastructure system to operate at a level that corresponds to the thermal load indicated by the data. In response to going offline, the management controller controls the infrastructure system to operate at an upper level that corresponds to an estimated thermal load predicated on an in-system power characterization of the configuration of the functional computer components.

18 Claims, 3 Drawing Sheets

(56) References Cited

U.S. PATENT DOCUMENTS

| | | |
|---|---|---|
| 8,838,286 B2 | 9/2014 | Florez-Larrahondo et al. |
| 8,938,736 B2 | 1/2015 | Lambert et al. |
| 2003/0056125 A1* | 3/2003 | O'Conner ................ G06F 1/26 713/300 |
| 2009/0187782 A1* | 7/2009 | Greene ................ G06Q 10/00 713/340 |
| 2009/0319650 A1* | 12/2009 | Collins ................ G06F 1/206 709/223 |
| 2011/0144818 A1* | 6/2011 | Li ........................ G06F 1/3203 700/291 |
| 2012/0041569 A1* | 2/2012 | Zhang ................ H05K 7/20836 700/17 |
| 2012/0101648 A1* | 4/2012 | Federspiel ......... G05D 23/1934 700/291 |
| 2012/0116590 A1* | 5/2012 | Florez-Larrahondo ...................... G06F 1/206 700/275 |
| 2012/0136502 A1 | 5/2012 | Liu |
| 2015/0032925 A1 | 1/2015 | Chidester et al. |
| 2015/0169030 A1* | 6/2015 | Coxe ................ G06F 1/3225 713/324 |
| 2015/0177814 A1* | 6/2015 | Bailey ................ G06F 1/3234 713/320 |
| 2015/0181752 A1* | 6/2015 | Bailey ................ H05K 7/1495 361/679.46 |
| 2016/0037686 A1* | 2/2016 | Shabbir ................ G06F 1/206 700/300 |

\* cited by examiner

SYSTEM AND METHOD FOR OPTIMIZED THERMAL CONTROL FOR MANAGEMENT CONTROLLER OFFLINE

BACKGROUND

1. Technical Field

This disclosure generally relates to information handling systems (IHS), and more particular to optimum fan speed and power capping when thermal load sensing is unavailable.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In a current design of a management controller that includes an access controller and a chassis management controller (CMC), there is no optimal thermal control and power management (throttling) when the access controller goes offline. Management controller can go offline for variety of different reason e.g. controller reset, firmware update etc. In particular, the current design of thermal control for the management controller when the access controller is offline is either to (i) maintain previous (last calculated) fan speed, which can result in insufficient cooling and thus increased equipment failure rates; or (ii) revert to full or maximum fan speed with unnecessary power consumption and noise generation. Hence, there is a lack of a proper method to find an optimal fan speed and power capping in these firmware (FW) offline states.

BRIEF SUMMARY

The illustrative embodiments of the present disclosure provide an information handling system (IHS) having functional components that are housed within a chassis and are interconnected in a configuration of one or more servers to operate as a fully functional IHS. An infrastructure system includes at least one of a power throttle module to limit power usage by the functional computer components and a fan module to cool the functional computer components. The IHS includes an access controller in communication with a sensor, which dynamically receives data related to a thermal load that is created by the functional components. A chassis management controller (CMC) is provided in communication with the access controller and the infrastructure system, and the CMC, in response to determining that the data is available from the access controller, controls the infrastructure system to operate at a level corresponding to the thermal load indicated by the data. In response to determining that the data is not available from the access controller, the CMC controls the infrastructure system to operate at an upper level that corresponds to an estimated thermal load predicated on an in-system power characterization of the configuration of the functional components and that is less than a maximum level.

According to at least one aspect of the present disclosure, a management controller of an IHS has functional computer components that are housed within a chassis and interconnected in a configuration of one or more servers to operate as a fully functional IHS. In one or more embodiments, the management controller includes an access controller in communication with a sensor that dynamically receives data related to a thermal load created by the functional computer components. The management controller includes a CMC in communication with the access controller and an infrastructure system of at least one of a power throttle module to limit power usage by the functional computer components and a fan module to cool the functional computer components. In response to determining that the data is available from the access controller, the CMC controls the infrastructure system to operate at a level corresponding to the thermal load indicated by the data. The infrastructure system can control thermal mitigating components or thermally aggravating components. A thermally mitigating component is operating to correspond to the thermal load by operating at least at a level that provides sufficient thermal dissipation. A thermal aggravating component is operated to correspond to the thermal load by operating at no more than a level for which sufficient thermal dissipation is being provided. In response to determining that the data is not available from the access controller, the CMC controls the infrastructure system to operate at an upper level that corresponds to an estimated thermal load predicated on an in-system power characterization of the configuration of the functional computer components and that is less than a maximum level.

According to at least one aspect of the present disclosure, a method of managing cooling of an IHS includes determining whether data is available from a sensor that is related to a thermal load that is created by functional components that are housed within a chassis of the IHS. The method includes, in response to determining that the data is available, controlling an infrastructure system to correspond to the thermal load indicated by the data to cool functional components. The method includes, in response to determining that the data is unavailable, controlling the infrastructure system to operate at an upper level that corresponds to an estimated thermal load predicated on an in-system power characterization of the configuration of the functional computer components and that is less than a maximum level.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
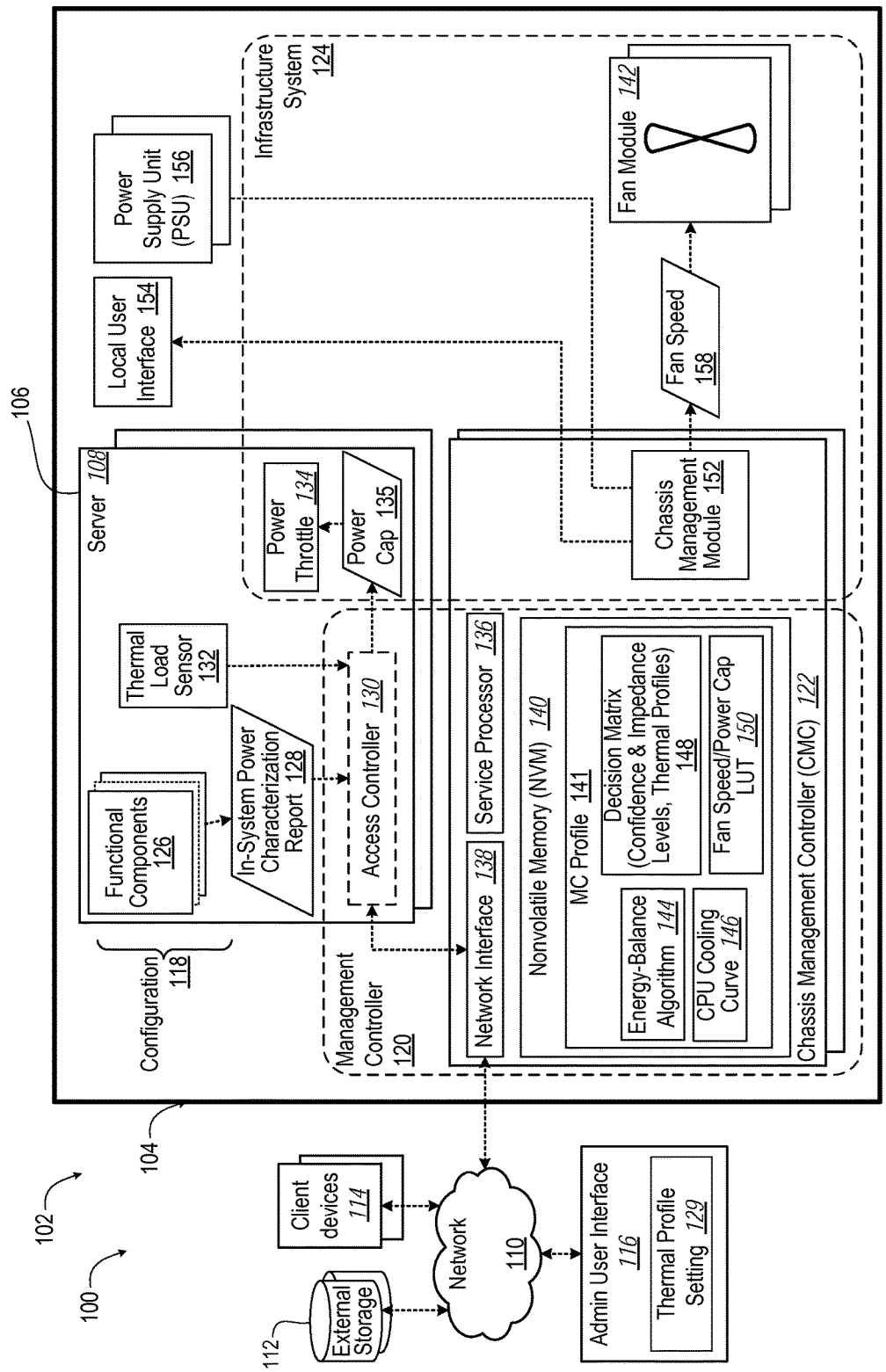
FIG. 1 illustrates a conceptual block diagram of a modular information handling system (IHS) that has a management controller that optimizes an infrastructure system of fan speed and power capping prior for a period of being offline, according to one or more embodiments.

An information handling system (IHS) includes functional computer components that are housed within a chassis and interconnected in a configuration of one or more servers to operate as a fully functional IHS. An infrastructure system includes a power throttle module to limit power usage by the functional computer components and/or a fan module to cool the functional computer components. An access controller is provided in communication with a sensor which dynamically receives data related to a thermal load that is created by the functional computer components. A management controller responds to the data is available by controlling the infrastructure system to correspond to the thermal load indicated by the data. In response to going offline, the management controller controls the infrastructure system to operate at an upper level that corresponds to an estimated thermal load predicated on an in-system power characterization of the configuration of the functional computer components.

The present disclosure provides optimized thermal control in an IHS in the event of a management controller being offline. Fan power optimization even for infrequent operating conditions can reduce long term recurring cost due to power consumption, as well as reducing avoiding unwarranted noise from overcooling or avoiding equipment damage due to undercooling. In one or more embodiments, the present disclosure can achieve optimized thermal control by using a calculated fan speed (CFS) that is based on an upper limit of an in-system power characterization value using an energy balance algorithm or a central processing unit (CPU) cooling curve. As utilized herein, energy balance algorithm involves using principles of thermodynamics to calculate airflow required for transferring an amount of heat, and determining fan speed that is required from that calculated airflow. In one or more embodiments, the present disclosure can achieve optimized thermal control by creating a decision matrix based on confidence level and impedance ranking which can include consideration of a user-selected thermal profile. In one or more embodiments, the present disclosure can achieve optimized thermal control by determination of final fan speed and power capping values based on the decision matrix.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates one exemplary embodiment of a scalable information handling system (IHS) 100 configured in the form of a modular blade server chassis system 102. For the purposes of this disclosure, an IHS 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS 100 may be a personal computer, a PDA, a consumer electronic device, a network storage device, or any other suitable device and may vary in size, shape, performance, functionality, and price. The IHS 100 may include memory, one or more processing resources such as a central processing unit (CPU) or hardware or software control logic. Additional components or the IHS 100 may include one or more storage devices, one or more communications ports for communicating with external devices as well as various input and output (I/O) devices, such as a keyboard, a mouse, and a video display. The IHS 100 may also include one or more buses operable to transmit communication between the various hardware components.

An outer structural physical framework 104 supports various compute, networking and storage resources that are contained in one or more chassis 106 to form servers 108, such as blade servers. The IHS 100 includes provisions for connection to various external networks 110, external storage 112, client devices 114, and administrative user interface(s) 116. In one or more embodiments, individual modular compute, networking and/or storage resources may be added and/or removed from the chassis system 102 (e.g., as removable and/or hot-pluggable modular components) and/or reconfigured over time so as to change the capabilities and/or performance of the system, these actions collectively changing a configuration 118 of the IHS 100. Connectivity between modular compute, networking and/or storage resources may also be reconfigured within the chassis system 102. It will be understood that although FIG. 1 illustrates a particular exemplary embodiment of a modular blade server chassis system 102, the disclosed systems and methods may be alternatively implemented with any other configuration of scalable IHS 100 that utilizes computing, networking and/or storage resources that can be removable, hot-pluggable, or otherwise changeable over time, possibly together with the configured connectivity between these resources.

Management controller 120 controls thermal cooling for the IHS 100. A portion of the management controller 120 resides within individual servers 108 and a portion resides in a chassis management controller (CMC) 122 that controls an infrastructure system 124 to provide the cooling. Functional computer components 126 of a server 108 having a configuration 118 that is reported as part of an in-system power characterization report 128 during boot to an access controller 130. The access controller 130, can serve as a remote access controller for allowing the administrative user interface(s) 116 to set a thermal profile 129 for the IHS 100, such as maximum performance or an energy saving mode. When the access controller 130 is available, the access controller 130 is placed in communication with a thermal load sensor 132 to determine data as to current thermal cooling requirements of the functional computer components 126. Part of the infrastructure system 124 for providing thermal cooling can reside in the server 108. For example, a power throttle 134 resides in server 108. Power throttle 134 limits an electrical power budget allocated to the server 108 via a power cap command 135, which can thus correspondingly limit the thermal energy generated by the server 108.

The portion of the management controller 120 that resides in the CMC 122 is subject to being unavailable when the access controller is unavailable. The CMC 122 also includes a bootable portion of a service processor 136, a network interface 138 and nonvolatile memory (NVM) 140. A management controller (MC) profile 141 resident in NVM 140 can include data structures used in determining thermal cooling settings such as for fan modules 142 and the power throttle 134. In an exemplary embodiment, NVM 140 includes (i) an energy-balance algorithm 144, (ii) CPU cooling curve 146, (iii) a decision matrix 148 that is indexed as a function of confidence level, impedance level, and thermal profile setting, and (iv) a fan speed/power cap look up table (LUT) 150. A chassis management module 152 of the CMC 122 can interface to a local user interface 154. The chassis management module 152 can communicate with power supply units (PSUs) 156 and can send fan speed control signals 158 to the fan modules 142. When the management controller 120 is unavailable, the chassis management module 152 provides continuity of basic functionality for thermal cooling.

Figure 2:
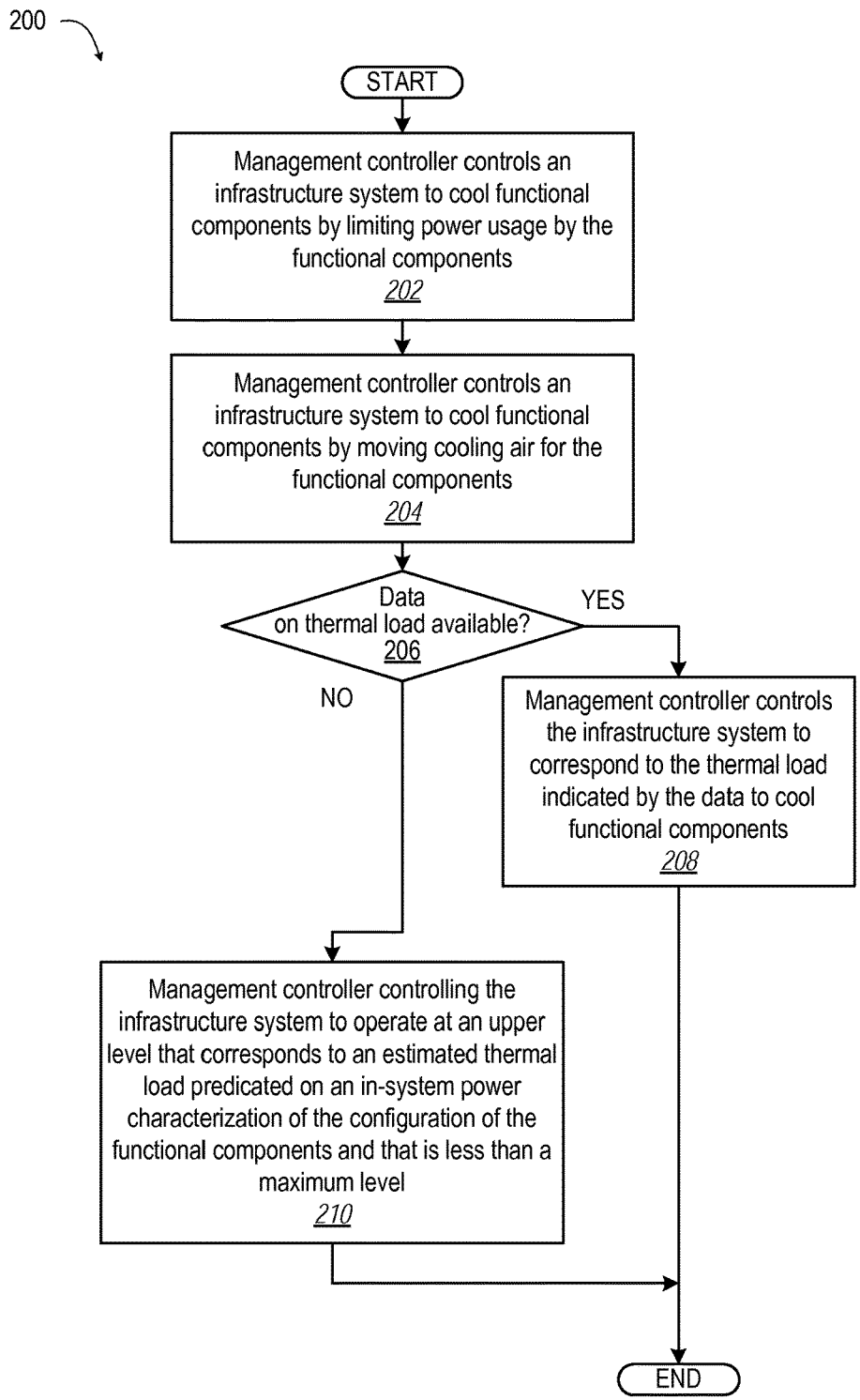
FIG. 2 illustrates a flow diagram of a method of managing cooling of an IHS, according to one or more embodiments.

FIG. 2 illustrates a method 200 of managing cooling of an IHS. In one or more embodiments, a management controller controls an infrastructure system to cool functional computer components by limiting power usage by the functional computer components (block 202). In one or more embodiments, the management controller controls an infrastructure system to cool functional computer components by moving cooling air for the functional computer components (block 204). The method 200 includes the management controller determining whether data is available from a sensor that is related to a thermal load that is created by functional computer components that are housed within a chassis of the IHS (decision block 206). The method 200 includes, in response to determining that the data is available in decision block 206, the management controller controlling the infrastructure system to operating in correspondence to the thermal load indicated by the data to cool functional computer components. Thermally aggravating components are prevented from exceeding available thermal cooling or thermally mitigating components are operated at least at a level to provide sufficient thermal cooling (block 208). Then method 200 ends. The method 200 includes, in response to determining that the data is unavailable in decision block 206, the management controller controlling the infrastructure system to operate at an upper level that corresponds to an estimated thermal load predicated on an in-system power characterization of the configuration of the functional computer components and that is less than a maximum level (block 210). Then method 200 ends.

Figure 3:
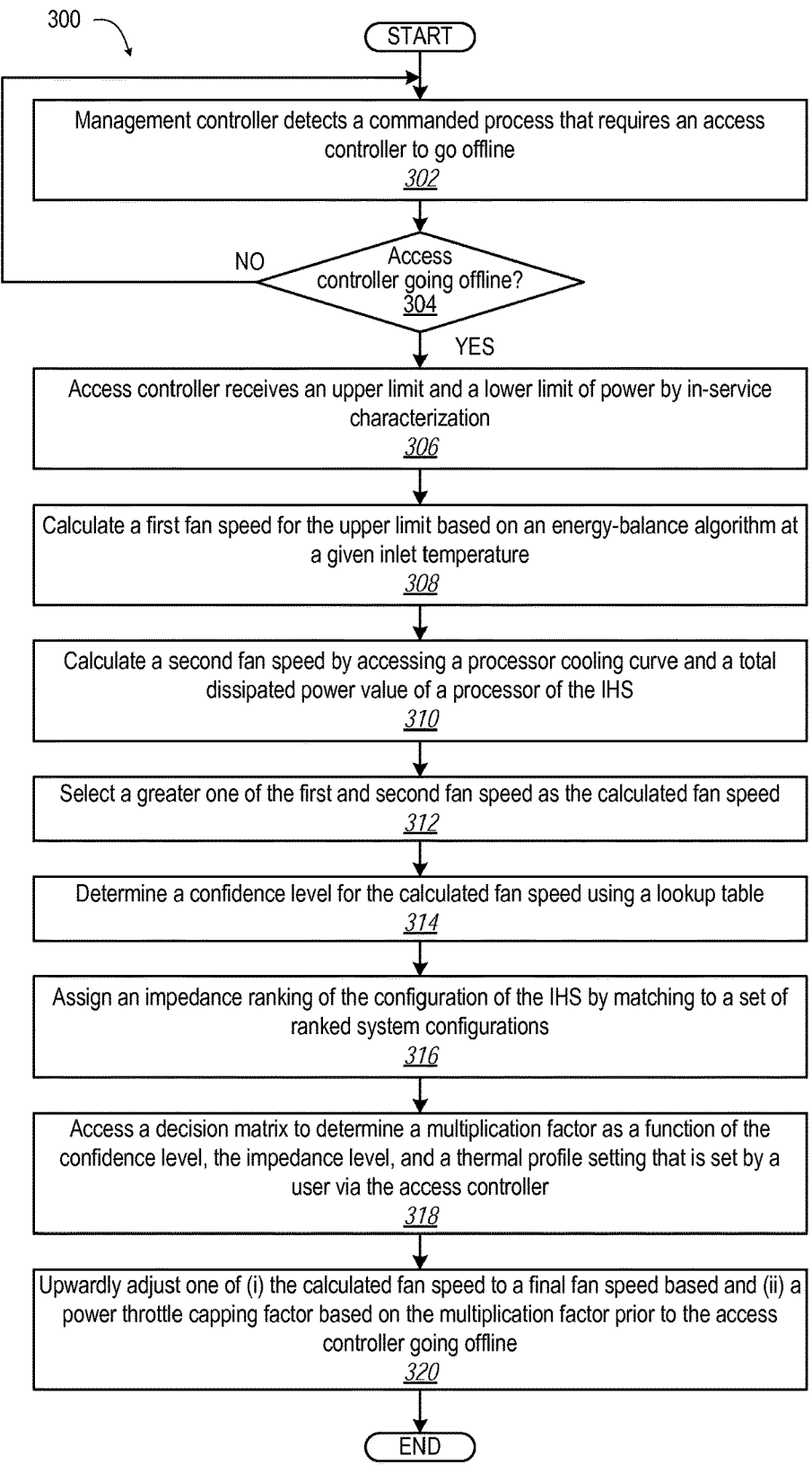
FIG. 3 illustrates a flow diagram of a method of optimizing cooling of functional computer components of an IHS when an access controller is going offline or has gone offline, according to one or more embodiments.

FIG. 3 illustrates an exemplary method 300 of optimizing cooling of functional computer components of an IHS when an access controller is going offline. In one or more embodiments, the method 300 includes a management controller detecting a commanded process that requires an access controller to go offline (block 302). Thereby, the management controller makes a determination of whether the data is not available by detecting the imminent offline status (decision block 304). In response to determining that the access controller is not going offline in decision block 304, method 300 returns to block 302 to continue monitoring for the "going offline" status. In response to determining in decision block 304 that the access controller is going offline, method 300 includes the management controller receiving, via the access controller, an upper limit and a lower limit of power by in-service characterization (block 306). The method 300 includes the management controller calculating a first fan speed for the upper limit based on an energy-balance algorithm at a given inlet temperature (block 308). The method 300 includes the management controller calculating a second fan speed by accessing a processor cooling curve and a total dissipated power value of a processor of the IHS (block 310). The method 300 includes the management controller selecting a greater one of the first and second fan speed as the calculated fan speed (block 312). The method 300 includes the management controller determining a confidence level for the calculated fan speed using a lookup table (block 314). The method 300 includes the management controller assigning an impedance ranking of the configuration of the IHS by matching to a set of ranked system configurations (block 316). The method 300 includes the management controller accessing a decision matrix to determine a multiplication factor as a function of the confidence level and the impedance level. In one or more embodiments, the multiplication factor is also a function of a thermal profile setting that is set by a user via the access controller (block 318). The method 300 includes the management controller upwardly adjusting one of (i) the calculated fan speed to a final fan speed and (ii) a power throttle capping factor based on the multiplication factor (block 320). In one or more embodiments, the adjusting occurs prior to the access controller going offline. Then method 300 ends.

In the above described flow charts of FIG. 2-3, one or more of the methods may be embodied in an automated controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

According to one or more aspects of the present disclosure, an example is provided for optimizing performance when the management controller is offline. As part of ISC (In-System Characterization) or a similar process, the management controller predicts lower and upper limits of dynamic power budget based on system configuration at boot, such as Low Limit (LL): 200 W—Upper Limit (UL): 550 W. UL value is used as maximum possible heat dissipation (MHD) by system (MHD=UL). Energy-Balance (EB) algorithm then predicts a fan speed required to cool MHD, such as 40% fan speed. CPU cooling curve, which is the fan speed required to cool CPU thermal design power (TDP) is also stored in Management Controller profile. For the given inlet ambient temperature, the CPU cooling curve will provide a maximum fan speed, assuming full CPU TDP load, such as 50% fan speed.

CFS (Calculated Fan Speed) will be higher one of above EB calculated and CPU cooling capability. CFS can be used as the minimum fan speed required in absence of Management Controller. In case of above example, it would be higher of 40% and 50%—hence 50%. CFS can provide a confidence level (CL) using below example TABLE 1 lookup table. CFS would be inversely proportional to CL.

TABLE 1

Confidence Level (CL) Lookup Table

| High Confidence Level (CL) | Medium CL | Low CL |
|---|---|---|
| >70% | 70-89% | 90-100% |

Impedance Ranking (IR) for the system can be determined based on system configuration. Current implementation of a thermal table allows defining system impedance ranking for configurations to enable specific actions based on these rankings. Impedance ranking adds system configuration impact to this calculated confidence level. Higher impedance configuration can mean greater chances of potential hotspots due to greater restriction to airflow. TABLE 2 provides an example IR lookup table:

TABLE 2

Impedance Ranking (IR) Lookup Table (Example)

| Impedance Ranking (IR) | Medium IR | Low IR |
|---|---|---|
| 8-10 | 5-7 | 1-4 |

A decision matrix is used to determine the choice for fan speed and power capping factors based on a combination of impedance ranking (IR), confidence level (CL) and system/thermal profile setting. The actual values in the table can be adjusted based on unique system thermal characteristics. See TABLE 3 as an example:

TABLE 3

Decision Matrix

| MaxPerf | Fan Speed | | Sys Pwr Cap | |
|---|---|---|---|---|
| MinPwr | Fan Speed | | Sys Pwr Cap | |

| | High IR | | Medium IR | | Low IR | |
|---|---|---|---|---|---|---|
| Low CL | 1.2 | 0.7 | 1.1 | 0.8 | 1.0 | 0.9 |
| | 1.0 | 0.7 | 1.0 | 0.8 | 1.0 | 0.9 |
| Medium CL | 1.1 | 0.8 | 1.0 | 0.9 | 1.0 | 1.0 |
| | 1.0 | 0.8 | 1.0 | 0.9 | 1.0 | 1.0 |
| High CL | 1.0 | 0.9 | 1.0 | 1.0 | 1.0 | 1.0 |
| | 1.0 | 0.9 | 1.0 | 1.0 | 1.0 | 1.0 |

Based on the above factors, before Management controller goes offline (such as racreset, fw update) new optimized fan speed and power capping can be applied. The following section will provide an example of the above method: From ISC, LL and UL is read: LL=188 W MHD=UL=418 W. Based on EB based equation: CFM=(1.76*UL)/(Tout−Tin) CFM=(1.76*418)/(60−25) CFM=21 CFM. Using PWM to CFM correlation stored within EB algorithm, the fan speed corresponding to 21 CFM is determined. In this example case, it would a value of 25%. Based on CPU cooling curve for (assuming 120 W CPU populated), the fan speed required to cool it to spec at 25 C ambient would be 30%. Based on proposed algorithm steps, the CFS will be 30%. As per configuration definition, the impedance ranking value of 4 is read from Management Controller. Hence, if CFS is 30%, then confidence level is High and Impedance Ranking is Low, then for Max Perf profile, we can apply the CFS at factor 1.0 and no additional power capping due to low IR. See TABLE 4 example decision matrix for the above factors.

TABLE 4

Decision Matrix for Example 1

| MaxPerf | Fan Speed | | Sys Pwr Cap | |
|---|---|---|---|---|
| MinPwr | Fan Speed | | Sys Pwr Cap | |

| | High IR | | Medium IR | | Low IR | |
|---|---|---|---|---|---|---|
| Low CL | 1.2 | 0.85 | 1.1 | 0.95 | 1.0 | 1.00 |
| | 1.0 | 0.70 | 1.0 | 0.80 | 1.0 | 0.90 |
| Medium CL | 1.1 | 0.95 | 1.0 | 0.95 | 1.0 | 1.00 |
| | 1.0 | 0.80 | 1.0 | 0.90 | 1.0 | 1.00 |
| High CL | 1.0 | 0.95 | 1.0 | 1.00 | 1.0 | 1.00 |
| | 1.0 | 0.90 | 1.0 | 1.00 | 1.0 | 1.00 |

Using another hypothetical example, if CFS comes out to be 75% with Impedance ranking of 8, then confidence level is medium and high impedance factor, and assuming Maximum Performance profile, the below matrix sets the same fan speed but requests a 20% power capping (operating at 80% of system power). Hence, again the present disclosure provides for saving significant fan power as compared to going to full speed. See TABLE 5 for decision matrix for the above.

TABLE 5

Decision Matrix for Example 2

| | | High IR | | Medium IR | | Low IR | |
|---|---|---|---|---|---|---|---|
| | | Fan Speed | Sys Pwr Cap | Fan Speed | Sys Pwr Cap | Fan Speed | Sys Pwr Cap |
| Low CL | MaxPerf | 1.2 | 0.85 | 1.1 | 0.95 | 1.0 | 1.00 |
| | MinPwr | 1.0 | 0.70 | 1.0 | 0.80 | 1.0 | 0.90 |
| Medium CL | MaxPerf | 1.1 | 0.95 | 1.0 | 0.95 | 1.0 | 1.00 |
| | MinPwr | 1.0 | 0.80 | 1.0 | 0.90 | 1.0 | 1.00 |
| High CL | MaxPerf | 1.0 | 0.95 | 1.0 | 1.00 | 1.0 | 1.00 |
| | MinPwr | 1.0 | 0.90 | 1.0 | 1.00 | 1.0 | 1.00 |

As compared to current implementations of keeping a last known fan speed, the present disclosure is less risky and avoids a potential for thermal risks. In addition, the present disclosure avoids setting to full speed when not required, which would result in power wastage. In the example presented, the present disclosure provides for 83% fan speed and sets a power capping of 5% to run at 95% of load. The latter power cap is a modest reduction in performance despite being presented with a high system impedance configuration. The difference in fan power between 83% and 100% fan speed can be substantial because fan power increases at a cubic rate of fan speed. An example measurement from a bank of server fans show 23 W advantage between fans running at 83% vs. 100% of full speed.

Hence, the present disclosure brings an optimum fan response in the absence of system thermal information, such as when the Management Controller is booting or similar situations. The optimum fan response avoids undercooling, overcooling or causing significant performance loss with some sort of excessive power capping.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system (IHS) comprising:
   a chassis;
   functional computer components that are housed within the chassis and interconnected in a configuration of one or more servers to operate as a fully functional IHS;
   an infrastructure system of at least one of a power throttle module to limit power usage by the functional computer components and a fan module to cool the functional computer components;
   an access controller in communication with a sensor which dynamically receives data related to a thermal load that is created by the functional computer components; and
   a chassis management controller (CMC) in communication with the access controller and the infrastructure system and which:
      in response to determining that the data is available from the access controller, controls the infrastructure system to operate at a first level that corresponds to the thermal load indicated by the data; and
      in response to determining that the data is not available from the access controller, controls the infrastructure system to operate at an upper level that corresponds to an estimated thermal load predicated on an in-system power characterization of the configuration of the functional computer components and that is less than a maximum level.

2. The IHS of claim 1, wherein to control the infrastructure system, the CMC:
   determining a maximum possible heat dissipation by in-system characterization; and determining a required operating value for the infrastructure system by using one of an energy balance algorithm and a central processing unit (CPU) cooling curve according to a current air inlet temperature.

3. The IHS of claim 1, wherein:
the CMC determines that the data is not available from the access controller by detecting a commanded process that requires the access controller to go offline; and
the CMC controls the infrastructure system, via the access controller, to the upper level prior to the access controller going offline.

4. The IHS of claim 3, wherein the access controller and the CMC operate together as a management controller to:
receive an upper limit and a lower limit of power by in-service characterization;
calculate a first fan speed for the upper limit based on an energy-balance algorithm at a given inlet temperature;
calculate a second fan speed by accessing a processor cooling curve and a total dissipated power value of a processor of the IHS; and
select a greater one of the first and second fan speed as a calculated fan speed.

5. The IHS of claim 4, wherein the management controller:
determines a confidence level for the calculated fan speed using a lookup table;
assigns an impedance ranking of the configuration of the IHS by matching to a set of ranked system configurations;
accesses a decision matrix to determine a multiplication factor as a function of the confidence level and the impedance ranking; and
upwardly adjusts one of (i) the calculated fan speed to a final fan speed based and (ii) a power throttle capping factor based on the multiplication factor.

6. The IHS of claim 5, wherein the management controller accesses the multiplication factor in the decision matrix further as a function of a thermal profile setting that is set by a user via the access controller.

7. A management controller of an information handling system (IHS) having functional computer components that are housed within a chassis and interconnected in a configuration of one or more servers to operate as a fully functional IHS, the management controller comprising:
an access controller in communication with a sensor which dynamically receives data related to a thermal load that is created by the functional computer components; and
a chassis management controller (CMC) in communication with the access controller and an infrastructure system of at least one of a power throttle module to limit power usage by the functional computer components and a fan module to cool the functional computer components, wherein the CMC:
in response to determining that the data is available from the access controller, controls the infrastructure system to correspond to the thermal load indicated by the data; and
in response to determining that the data is not available from the access controller, controls the infrastructure system to operate at an upper level that corresponds to an estimated thermal load predicated on an in-system power characterization of the configuration of the functional computer components and that is less than a maximum level.

8. The management controller of claim 7, wherein to control the infrastructure system, the CMC:

determining a maximum possible heat dissipation by in-system characterization; and
determining a required operating value for the infrastructure system by using one of an energy balance algorithm and a central processing unit (CPU) cooling curve according to a current air inlet temperature.

9. The management controller of claim 7, wherein:
the CMC determines that the data is not available from the access controller by detecting a commanded process that requires the access controller to go offline; and
the CMC controls the infrastructure system, via the access controller, to the upper level prior to the access controller going offline.

10. The management controller of claim 9, wherein the access controller and the CMC operate together to:
receive an upper limit and a lower limit of power by in-service characterization;
calculate a first fan speed for the upper limit based on an energy-balance algorithm at a given inlet temperature;
calculate a second fan speed by accessing a processor cooling curve and a total dissipated power value of a processor of the IHS; and
select a greater one of the first and second fan speed as a calculated fan speed.

11. The management controller of claim 10, wherein the management controller:
determines a confidence level for the calculated fan speed using a lookup table;
assigns an impedance ranking of the configuration of the IHS by matching to a set of ranked system configurations;
accesses a decision matrix to determine a multiplication factor as a function of the confidence level and the impedance ranking; and
upwardly adjusts one of (i) the calculated fan speed to a final fan speed based and (ii) a power throttle capping factor based on the multiplication factor.

12. The management controller of claim 11, wherein the management controller accesses the multiplication factor in the decision matrix further as a function of a thermal profile setting that is set by a user via the access controller.

13. A method of managing cooling of an information handling system (IHS), the method comprising:
determining whether data is available from a sensor that is related to a thermal load that is created by functional components that are housed within a chassis of the IHS;
in response to determining that the data is available, controlling an infrastructure system in correspondence to the thermal load indicated by the data to cool functional components;
in response to determining that the data is unavailable, controlling the infrastructure system to operate at an upper level that corresponds to an estimated thermal load predicated on an in-system power characterization of the configuration of the functional components and that is less than a maximum level;
wherein determining that the data is not available comprises detecting a commanded process that requires an access controller to go offline; and
wherein controlling the infrastructure system comprises controlling, via the access controller, the infrastructure system to the upper level prior to the access controller going offline.

14. The method of claim 13, wherein controlling an infrastructure system to cool functional computer components comprises one of limiting power usage by the functional computer components and moving cooling air for the functional computer components.

15. The method of claim 13, wherein controlling the infrastructure system to operate at an upper level comprises:
   determining a maximum possible heat dissipation by in-system characterization; and
   determining a required operating value for the infrastructure system by using one of an energy balance algorithm and a central processing unit (CPU) cooling curve according to a current air inlet temperature.

16. The method of claim 13, further comprising
   receiving an upper limit and a lower limit of power by in-service characterization;
   calculating a first fan speed for the upper limit based on an energy-balance algorithm at a given inlet temperature;
   calculating a second fan speed by accessing a processor cooling curve and a total dissipated power value of a processor of the IHS; and
   selecting a greater one of the first and second fan speed as a calculated fan speed.

17. The method of claim 16, further comprising:
   determining a confidence level for the calculated fan speed using a lookup table;
   assigning an impedance ranking of the configuration of the IHS by matching to a set of ranked system configurations;
   accessing a decision matrix to determine a multiplication factor as a function of the confidence level and the impedance ranking; and
   upwardly adjusting one of (i) the calculated fan speed to a final fan speed based and (ii) a power throttle capping factor based on the multiplication factor.

18. The method of claim 17, wherein accessing the multiplication factor in the decision matrix comprises accessing as a function of a thermal profile setting that is set by a user via the access controller.

* * * * *